United States Patent [19]
Knecht et al.

[11] Patent Number: 5,347,555
[45] Date of Patent: Sep. 13, 1994

[54] METHOD FOR SHREDDING AND PACKING FUEL ASSEMBLY CASES OR SIMILAR NUCLEAR REACTOR STRUCTURAL ELEMENTS AND APPARATUS FOR PERFORMING THE METHOD

[75] Inventors: Klaus Knecht; Heinz Knaab, both of Erlangen, Fed. Rep. of Germany

[73] Assignee: Siemens Aktiengesellschaft, Munich, Fed. Rep. of Germany

[21] Appl. No.: 51,636

[22] Filed: Apr. 22, 1993

[30] Foreign Application Priority Data

Apr. 22, 1992 [DE] Fed. Rep. of Germany ....... 4213260

[51] Int. Cl.$^5$ ............................................ G21C 19/34
[52] U.S. Cl. ................................... 376/261; 376/313; 241/60; 241/100; 241/101.2; 83/930
[58] Field of Search ............... 376/260, 261, 272, 313; 83/930, 923; 252/633, 626; 241/60, 100, 101.2, DIG. 38

[56] References Cited

U.S. PATENT DOCUMENTS

| | | | |
|---|---|---|---|
| 2,105,759 | 1/1938 | Stevenson | 241/60 |
| 4,196,169 | 4/1980 | Gablin et al. | 252/628 |
| 4,290,906 | 9/1981 | Saito et al. | 376/261 |
| 4,643,845 | 2/1987 | Omote et al. | 376/261 |

FOREIGN PATENT DOCUMENTS

| | | |
|---|---|---|
| 0163868 | 12/1985 | European Pat. Off. . |
| 3226986 | 8/1984 | Fed. Rep. of Germany . |
| 3420803 | 12/1985 | Fed. Rep. of Germany . |
| 248216 | 7/1987 | Fed. Rep. of Germany . |
| 3437719 | 7/1989 | Fed. Rep. of Germany . |
| 3513692 | 6/1991 | Fed. Rep. of Germany . |
| 4031153 | 4/1992 | Fed. Rep. of Germany . |
| 60-146200 | 8/1985 | Japan . |

*Primary Examiner*—Daniel D. Wasil
*Attorney, Agent, or Firm*—Herbert L. Lerner; Laurence A. Greenberg

[57] ABSTRACT

A method for shredding and packing used structural elements of nuclear reactors, such as fuel assembly cases, comprises the steps of shredding structural elements to scrap pieces; flushing the scrap pieces in a transport container and flushing away highly radioactive particles of foreign matter and collecting the particles in the interior of the transport container; packing the flushed scrap pieces around the particles of foreign matter collected in the interior; and inserting the packed transport container into a sealable disposal container. An apparatus for performing the method includes a shredder assembly, an interchangeable transport container disposed below the shredder assembly; connectors for connecting the transport housing in a liquid cycle; a filter disposed in the liquid cycle; a carriage for laterally displacing the transport container relative to the shredder assembly; and lifting and transportation devices for lifting the transport container and for inserting the transport container into an ultimate disposal container.

23 Claims, 3 Drawing Sheets

METHOD FOR SHREDDING AND PACKING FUEL ASSEMBLY CASES OR SIMILAR NUCLEAR REACTOR STRUCTURAL ELEMENTS AND APPARATUS FOR PERFORMING THE METHOD

The invention relates to a method for shredding or comminuting and packing used structural elements of nuclear reactors, particularly fuel assembly cases. The invention also relates to a system for carrying out the method, a shredder adapted to the method, and a suitable, interchangeable transport container.

Fuel assembly cases typically comprise zirconium or zirconium alloys, onto which products of corrosion and other foreign matter have settled during reactor operation. In the pure state, after neutron bombardment, these materials are beta emitters; if they are temporarily stored in the water pit of a nuclear reactor for approximately two years, then only a relatively weak beta emission occurs, which can easily be shielded. However, products of corrosion and other matter may contain gamma emitters or similar radioactive matter that requires special shielding for disposal purposes. Used structural parts that are compacted into scrap and comminuted for ultimate disposal cannot be packed arbitrarily compactly in ultimate disposal containers, and the ultimate disposal containers must have suitably thick walls to shield off this radiation. Adequate radiation shielding must be assured during the comminution and packing process.

SUMMARY OF THE INVENTION

It is accordingly an object of the invention to provide a method for shredding and packing fuel assembly cases or similar nuclear reactor structure elements, and an apparatus for performing the method, which overcomes the hereinafore-mentioned disadvantages of the heretofore-known methods and devices of this general type and which substantially lessens the expense for the disposal of such used structural elements.

The invention takes as its point of departure from the prior art the concept of separating the weakly radioactive metal from the strongly radioactive foreign matter during the comminution, with the foreign matter being stored approximately in the center of the ultimate disposal container, and the weakly radioactive materials being packed around it so that they already act as a shield for the radioactive foreign matter. This lessens the expense for the requisite shielding material at the ultimate disposal site and enables better utilization of the storage volume. The same quantity of scrap can for instance now be stored in smaller, more densely packed ultimate disposal containers. If standardized external dimensions are specified for the ultimate disposal containers, their shielding walls can be made thinner, or for a standardized wall thickness, more scrap can be packed by increasing the packing density.

With the foregoing and other objects in view there is provided, in accordance with the invention, a method for shredding and packing used structural elements of nuclear reactors, such as fuel assembly cases, which comprises: shredding structural elements to scrap pieces; flushing the scrap pieces in a transport container; flushing out particles of foreign matter and collecting the particles in the interior of the transport container; packing the flushed scrap pieces around the particles of foreign matter collected in the interior; and inserting the packed transport container into a sealable disposal container.

In accordance with an added feature of the invention, the method comprises continuously feeding the scrap pieces produced in the shredding step into an annular space in the transport container surrounding a filter and flushing the scrap pieces with a stream of liquid removed by suction via the filter until the annular space is virtually filled with scrap, and drying the transport container with the filter and the scrap prior to the step of inserting the packed transport container into the disposal container.

In other words, the used elements are shredded to scrap pieces that are flushed in a transport container, and the flushed-out particles of foreign matter are collected in the interior of the transport container. Particularly, the scrap pieces produced during the shredding, for instance, can be fed continuously into an annular space in the transport container surrounding a filter and flushed by a stream of liquid that is removed by suction via the filter, until the annular space is virtually filled with scrap pieces. Hence the scrap pieces are packed around the collected foreign matter, and the thus-packed transport container is inserted into a sealable disposal container. Advantageously, the transport container, with the filter laden with particles of (highly radioactive) foreign matter and with the scrap pieces, is dried before being inserted into the ultimate disposal container.

Nuclear reactors have a water-filled storage pit, disposed next to the site where the fuel assemblies are used, and into which the fuel assemblies can be moved for repair work and inspection underwater.

Advantageously, the method is performed underwater in this water pit of the nuclear reactor, and the comminuted scrap pieces drop into the transport container, where they are flushed. The water in the water pit thus not only serves as a radiation shield but also serves to flush the scrap. The water removed by suction via the filter is returned to the water pit after the flushing and collection of the particles of foreign matter, and advantageously it is additionally passed through the already existing filter for pit water cleaning. In that case, even if the filter disposed centrally in the transport container is overburdened, contamination of the pit water will be avoided.

The fuel assembly cases or structural parts are comminuted to an average size adapted to the desired packing density of the container, and the transport container can be shaken during packing in order to assure the desired packing density. For drying, the transport container is preferably lifted out of the water pit underneath a shielding dome. To obtain adequate shielding outside the water pit as well, the transport container may be covered at the top with a transport lid and inserted along with the transport lid into the disposal container.

With the object of the invention in view there is also provided, in accordance with a further feature of the invention, a system for shredding and packing used structural elements of nuclear reactors, comprising: shredder means for shredding structural elements to scrap pieces; an interchangeable transport container disposed below the shredder means; means for connecting the transport housing in a liquid cycle; a filter disposed in the liquid cycle; carriage means for laterally displacing the transport container relative to the shredder; and lifting and transportation means for lifting the transport container and for inserting the transport container into a ultimate disposal container.

In other words, and with reference to a preferred embodiment, a suitable system for carrying out the novel method includes a shredder and an interchangeable transport container, which is disposed below the shredder and has a central filter and a connection to a liquid cycle. A carriage makes it possible to displace the transport container with the filter laterally relative to the shredder. A lifting device is also provided with a shielding dome open at the bottom and a transport means for transporting the transport container with the filter, in order to insert the transport container, with the scrap pieces packed around the filter, into a ultimate disposal container.

While a corresponding lifting device and a transport means are typically already available in the reactor in order to manipulate the fuel assemblies during inspections and repairs, the invention above all provides an additional component for performing the method, namely in the form of the shredder and the carriage for holding and transporting the transport container.

The transport container is an interchangeable part that should be furnished to match the amount of scrap produced.

In accordance with an additional feature of the invention, the connecting means include a connector communicating with the filter, and including a connecting line communicating with the connector and a pump for drawing liquid through the filter.

In accordance with a further feature of the invention, the lifting means includes a downwardly open shielding dome with an interior, and including a transport lid suspended within the interior of the shielding bell and being releaseable from outside.

In accordance with yet an added feature of the invention, the lifting and transport means are in the form of a moveable support scaffold including a downwardly open shielding dome, a lifting mechanism reaching through the shielding bell and a hitch device for transporting the transport container.

In accordance with yet another feature of the invention, the hitch device includes means for releaseably holding the transport lid for securing the transport container.

In accordance with an additional feature of the invention, the comminutor means include a feed hopper or funnel for receiving the structural elements to be comminuted and processed through the comminutor in a given direction, a compacting die disposed downstream from the feed hopper in the given direction, a cutting tool with a tool drive mechanism disposed downstream of the compacting die, the comminutor means having an outlet formed therein for scrap pieces, and including means for positioning a transport container between the carriage and the comminutor means and for connecting the transport container in a liquid cycle.

In accordance with yet an additional feature of the invention, the system includes a sealing surface disposed at the outlet for the scrap pieces, and means for attaching the transport container to the sealing surface.

In accordance with again a further feature of the invention, the cutting tool includes a shredder with shears and cutting drums rotating in opposite directions disposed downstream of the shredder.

In accordance with again an added feature of the invention, the connecting means are formed of a suction connector disposed in the interchangeable transport container directly communicating with the filter.

In accordance with again an additional feature of the invention, the transport container includes a bottom wall having a connection opening formed therein, the suction connector being mounted in the bottom wall of the transport container.

In accordance with an added feature of the invention, the transport container includes a laterally closed sheet-metal casing, an upper open end, and a hanger device for lifting the transport container at the upper open end.

In accordance with a further feature of the invention, the transport housing has a central axis, the filter being disposed in the housing and extending along the central axis of the transport container. Additionally, the system includes a perforated filter housing and the filter is retained in the perforated filter housing.

In accordance with a concomitant feature of the invention, the system includes means for flushing radioactive foreign matter from the scrap pieces in the transport container and for storing the radioactive foreign matter in a central portion of the transport container, and a ultimate disposal container for receiving the transport container, the disposal container having outer shielding walls with a wall thickness adapted to a radiation load from the radioactive foreign matter stored in the center of the transport container and reduced in accordance with a volume and packing density of the scrap pieces surrounding the radioactive foreign matter.

Other features which are considered as characteristic for the invention are set forth in the appended claims.

Although the invention is illustrated and described herein as embodied in a method for comminuting and packing fuel assembly cases or similar nuclear reactor structure elements, and an apparatus for performing the method, it is neverthe- less not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
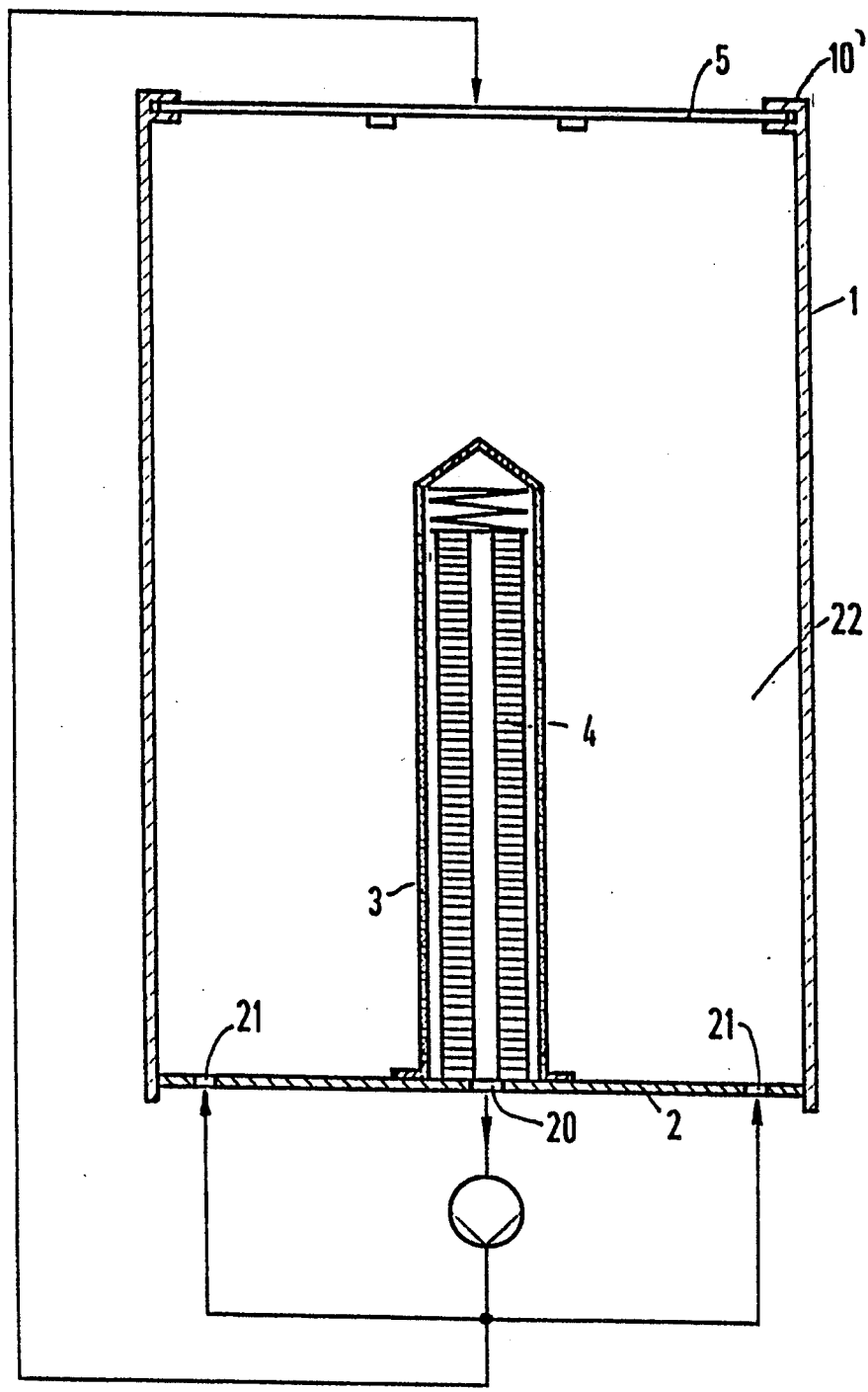
FIG. 1 is a cross-sectional view of a transport container according to the invention, with a filter.

Referring now to the figures of the drawing in detail, and first to FIG. 1 thereof, there is seen a transport container preferably formed by a sheet-metal casing 1. A perforated filter housing 3 is secured to a bottom 2 of the sheet metal casing 1. A filter 4 is retained in the filter housing 3, disposed approximately centrally in the interchangeable transport container. The filter housing and the filter have a suction connection 20, for the removal by suction of a stream of liquid that is passed through the annular space 22 surrounding the filter and is cleaned of entrained particles of foreign matter by means of the filter.

This stream of liquid can enter via suitable openings 21 formed in the bottom 2 and/or the upper opening of the transport container. A hanger or suspension device 5 for lifting the transport container is provided at the upper opening, and moreover, the upper rim of the transport container may be embodied as a retaining means and sealing surface, in order to attach the transport container to the bottom outlet opening of a comminutor.

According to the invention, the shredding or comminution of the fuel assembly cases, the flushing and packing of the scrap pieces produced, and the collection of the particles of foreign matter flushed out in the process take place simultaneously and virtually all at the same location, namely underwater in the water pit of the reactor, or in other words next to the site where the fuel assembly is used. Only the insertion of the packed transport container into the ultimate or final disposal container and optionally an intervening drying operation take place afterward, outside the water pit.

Figure 2:
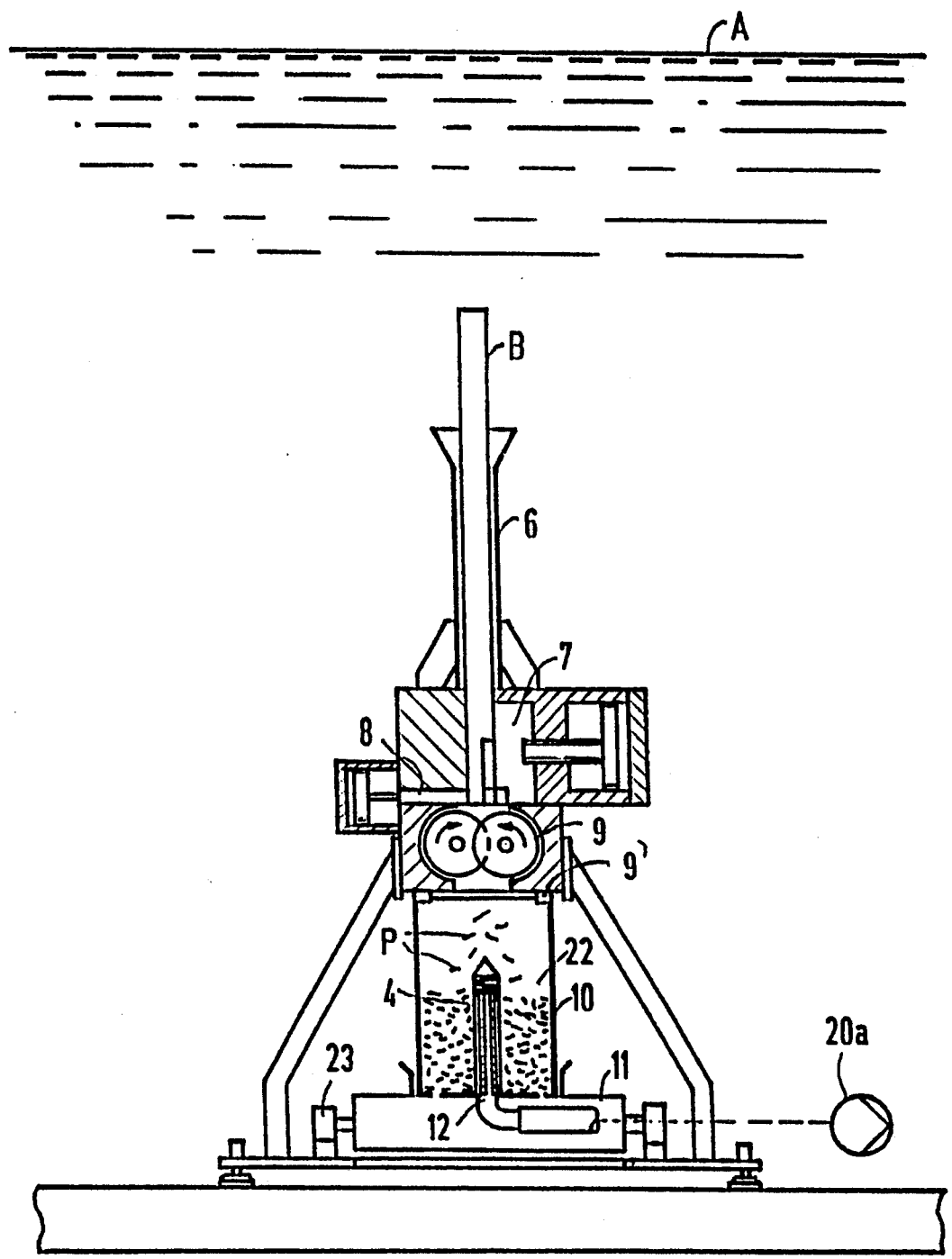
FIG. 2 is a cross-sectional, diagrammatic view of a comminutor according to the invention.

An advantageous shredder assembly or comminutor shown in FIG. 2 has a feed hopper or funnel 6 for the used structural elements (such as fuel assembly cases B), an initial compacting die 7 of a scrap press and a following cutting tool, here embodied in the form of a shredder with shears 8 and following cutting drums 9 rotating counter to one another. This makes it possible to cut the scrap apart into pieces P of a maximum size of between 1 cm and 5 cm, for example.

The scrap size is chosen such that the scrap pieces P, on dropping out of the shredder assembly onto the bottom of the annular space 22, disposed between the sheet-metal casing 1 of the transport container and the filter 4 at the center of the container along its central axis, will be stratified automatically—optionally with shaking with a shaking motor 23—at the desired packing density. In other words, the scrap pieces are neither so small nor so light that they could be entrained by a stream of liquid flowing through the container 10, yet are not so heavy or large that they become too bulky to settle in the transport container with the desired packing density.

The transport container 10, which may be attached by its upper rim 10' to a sealing surface 91' provided on the bottom of the shredder assembly, rests on a carriage 11, with which it is positioned in the illustrated operating position at the lower outlet opening of the comminutor. The carriage 11 includes a suction connection 12, which is embodied as a mate to the suction connection 20 of the filter 4 and is connected to a liquid cycle with its own, powerful pump 20a. A line from the suction connection 12 or connector stub to the pump 20a may lead through the filter of the pit cleaning system, which is provided in any case, and back into the water pit.

Figure 3:
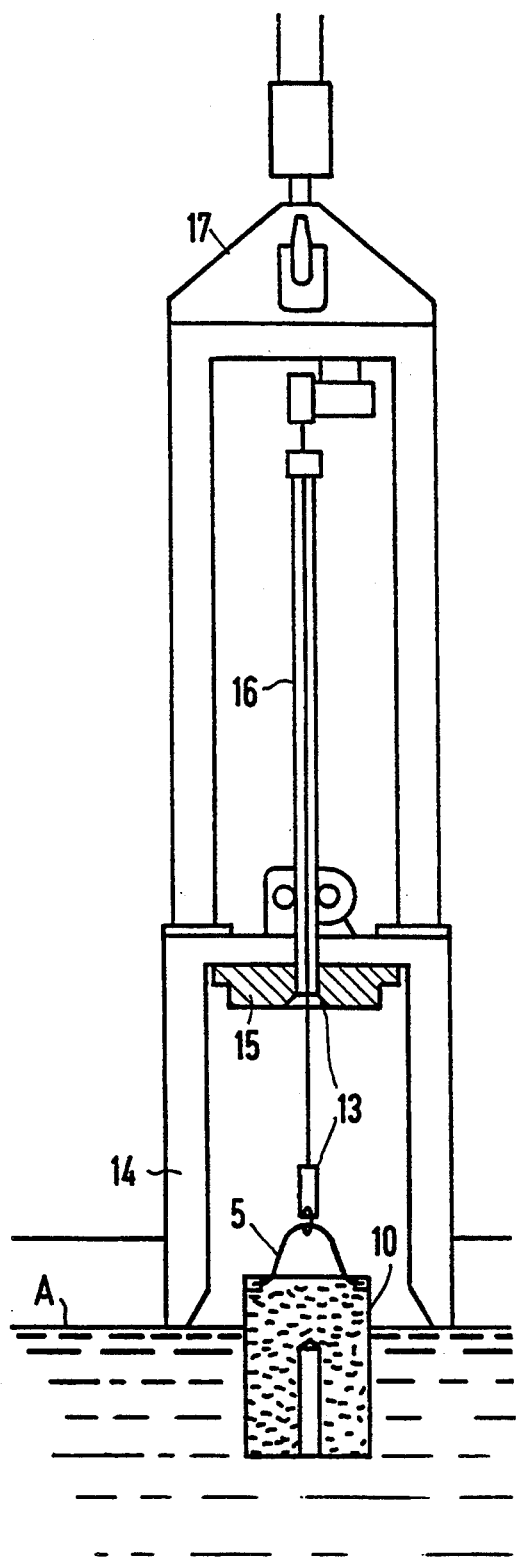
FIG. 3 is a diagrammatic view of a transport apparatus.

An exemplary method and the operation of the apparatus may be explained in the following way: When spent fuel assemblies from the reactor core are withdrawn, they are first freed of the fuel rods, which must be disposed of separately. Then the remaining structural elements are moved via a movable support scaffold under the waver level A to the comminutor, shown in FIG. 2, where they are shredded. In this process, corrosion particles and other foreign matter are detached from the surface of the scrap; they are entrained as suspended matter by the fluid flowing through the transport container and are collected at the filter 4. The laden filter 4 thus becomes an increasingly strong source of radiation, yet is increasingly shielded by the scrap collecting laterally of it. Once the transport container has reached a predetermined fill level, it is moved by the carriage 11 out of the working position shown in FIG. 2 laterally to below a transport means, such as the transport scaffold 17 of FIG. 3.

The transport scaffold has a lifting device, with a lifting mechanism 16 which extends through a shielding dome 17 and from which a transport lid 15 and the transport container 10 are suspended, advantageously via a remote-controlled hitch device 13. The transport container 10 is grasped at its hanger device 5 with the hitch device 13, and lifted into the covering bell, where it can be closed and sealed with the transport lid 15.

Figure 4:
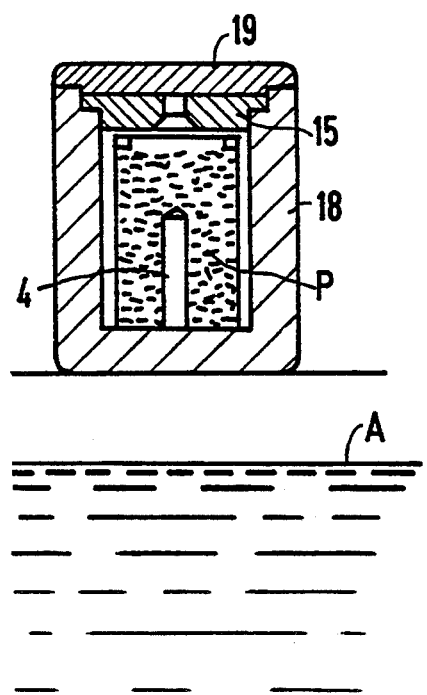
FIG. 4 is a sectional view of a ultimate disposal container.

As soon as the transport container has been lifted to above a liquid surface A, the pit water in the transport container can drain out via the suction connection 20 formed in the bottom of the transport container, and via the additional connection 21, if applicable. Optionally, in this position of the shielding bell and transport container, further drying (by chemical means, for instance) may also be performed. The dry container can then be moved by the movable support scaffold 17 to an ultimate disposal or final disposal container 18 or storage container (FIG. 4) and inserted into it. At that time, a final disposal container lid 19 may be set in place. In this way, a package is created in whose center the filter 4, laden with radioactive foreign matter, is disposed; it is already partly shielded by the weakly radioactive scrap P, so that relatively thin shielding walls 18 and lids 15, 19 are all that is needed for ultimate disposal, and the package can be shipped out without danger.

The foregoing is a description corresponding in substance to German Application P 42 13 260.6, dated Apr. 22, 1992, the International priority of which is being claimed for the instant application, and which is hereby made part of this application. Any material discrepancies between the foregoing specification and the aforementioned corresponding German application are to be resolved in favor of the latter.

We claim:

1. A method for shredding and packing used structural elements of nuclear reactors, which comprises:
shredding structural elements to scrap pieces;
flushing the scrap pieces in a transport container;
flushing out particles of foreign matter and collecting the particles in the interior of the transport container;
packing the flushed scrap pieces around the particles of foreign matter collected in the interior; and
inserting the packed transport container into a sealable disposal container.

2. The method according to claim 1, which comprises continuously feeding the scrap pieces produced in the shredding step into an annular space in the transport container surrounding a filter and flushing the scrap pieces with a stream of liquid removed by suction via the filter until the annular space is virtually filled with scrap, and drying the transport container with the filter and the scrap prior to the step of inserting the packed transport container into the disposal container.

3. The method according to claim 1, which comprises shredding the structural elements underwater in a water pit of a nuclear reactor, dropping the scrap pieces into the transport container after the shredding step, and flushing the scrap with water from the water pit.

4. The method according to claim 3, which comprises, subsequently to the flushing and collecting steps, returning flushing liquid through the water pit and through a filter provided for the water of the water pit into the transport container.

5. The method according to claim 3, which comprises lifting the transport container out of the water pit under a shielding dome and drying the transport container with the scrap.

6. The method according to claim 5, which comprises covering the transport container with a transport lid outside the water pit, and inserting the transport container along with the transport lid into the ultimate disposal container.

7. The method according to claim 1, which comprises shaking the transport container during the step of packing the scrap particles.

8. The method according to claim 1, which comprises defining a desired packing density in the transport container, and shredding the structural parts into scrap pieces of an average size adapted to the desired packing density.

9. A method for shredding and packing used fuel assembly cases of nuclear reactors, which comprises: shredding fuel assembly cases to scrap pieces; flushing the scrap pieces in a transport container; flushing out particles of foreign matter and collecting the particles in the interior of the transport container; packing the flushed scrap pieces around the particles of foreign matter collected in the interior; and inserting the packed transport container into a sealable disposal container.

10. A system for shredding and packing used structural elements of nuclear reactors, comprising: shredder means for shredding structural elements to scrap pieces; an interchangeable transport container disposed below said shredder means; means for connecting said transport container in a liquid cycle; a filter disposed in said transport container and communicating in the liquid cycle; carriage means for laterally displacing said transport container relative to said shredder; and lifting and transportation means for lifting said transport container and for transporting said transport container to an ultimate disposal container.

11. The system according to claim 10, wherein said connecting means include a connector communicating with said filter, and including a connecting line communicating with said connector and a pump for drawing liquid through said filter.

12. The system according to claim 10, wherein said lifting and transportation means includes a downwardly open shielding dome with an interior, and including a transport lid suspended within the interior of said shielding bell and being releaseable from outside.

13. The system of one according to claim 10, wherein said lifting and transportation means are in the form of a moveable support scaffold including a downwardly open shielding dome, a lifting mechanism reaching through said shielding bell and a hitch device for transporting said transport container.

14. The system according to claim 13, wherein said hitch device includes means for releaseably holding said transport lid for securing said transport container.

15. The system according to claim 10, wherein said shredder means include a feed hopper for receiving the structural elements to be comminuted and processed through said shredder in a given direction, a compacting die disposed downstream from said feed hopper in the given direction, a cutting tool with a tool drive mechanism disposed downstream of said compacting die, said shredder means having an outlet formed therein for scrap pieces, and including means for positioning a transport container between said carriage and said shredder means and for connecting said transport container in a liquid cycle.

16. The system according to claim 15, including a sealing surface disposed at said outlet for the scrap pieces for sealing said transport container at said outlet for the scrap pieces.

17. The system according to claim 15, wherein said cutting tool includes a shredder with shears and cutting drums rotating in opposite directions disposed downstream of said shredder.

18. The system according to claim 10, wherein said connecting means are formed of a suction connector disposed in said interchangeable transport container directly communicating with said filter.

19. The system according to claim 18, wherein said transport container includes a bottom wall having a connection opening formed therein, said suction connector being mounted in said bottom wall of said transport container.

20. The system according to claim 18, wherein said transport container includes a laterally closed sheet-metal casing, an upper open end, and a hanger device for lifting said transport container at said upper open end.

21. The system according to claim 10, wherein said transport housing has a central axis, said filter being disposed in said housing and extending along said central axis of said transport container.

22. The system according to claim 10, including a perforated filter housing, said filter being retained in said perforated filter housing.

23. The system according to claim 10, including means for flushing radioactive foreign matter from the scrap pieces in said transport container and for storing the radioactive foreign matter in a central portion of said transport container, and a ultimate disposal container for receiving said transport container, said disposal container having outer shielding walls with a wall thickness adapted to a radiation load from the radioactive foreign matter stored in the center of said transport container and reduced in accordance with a volume and packing density of the scrap pieces surrounding the radioactive foreign matter.

* * * * *